Patented Aug. 11, 1953

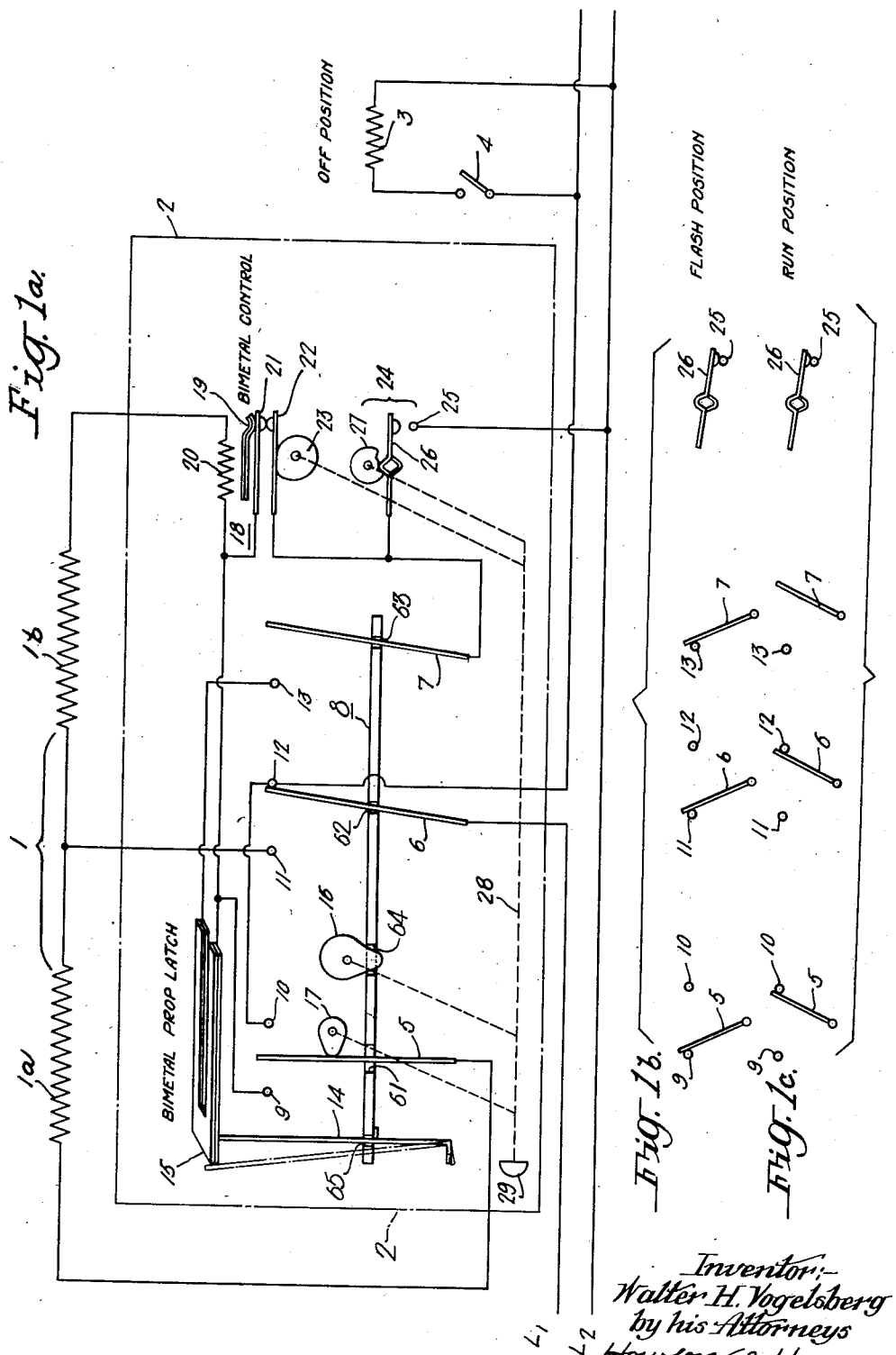

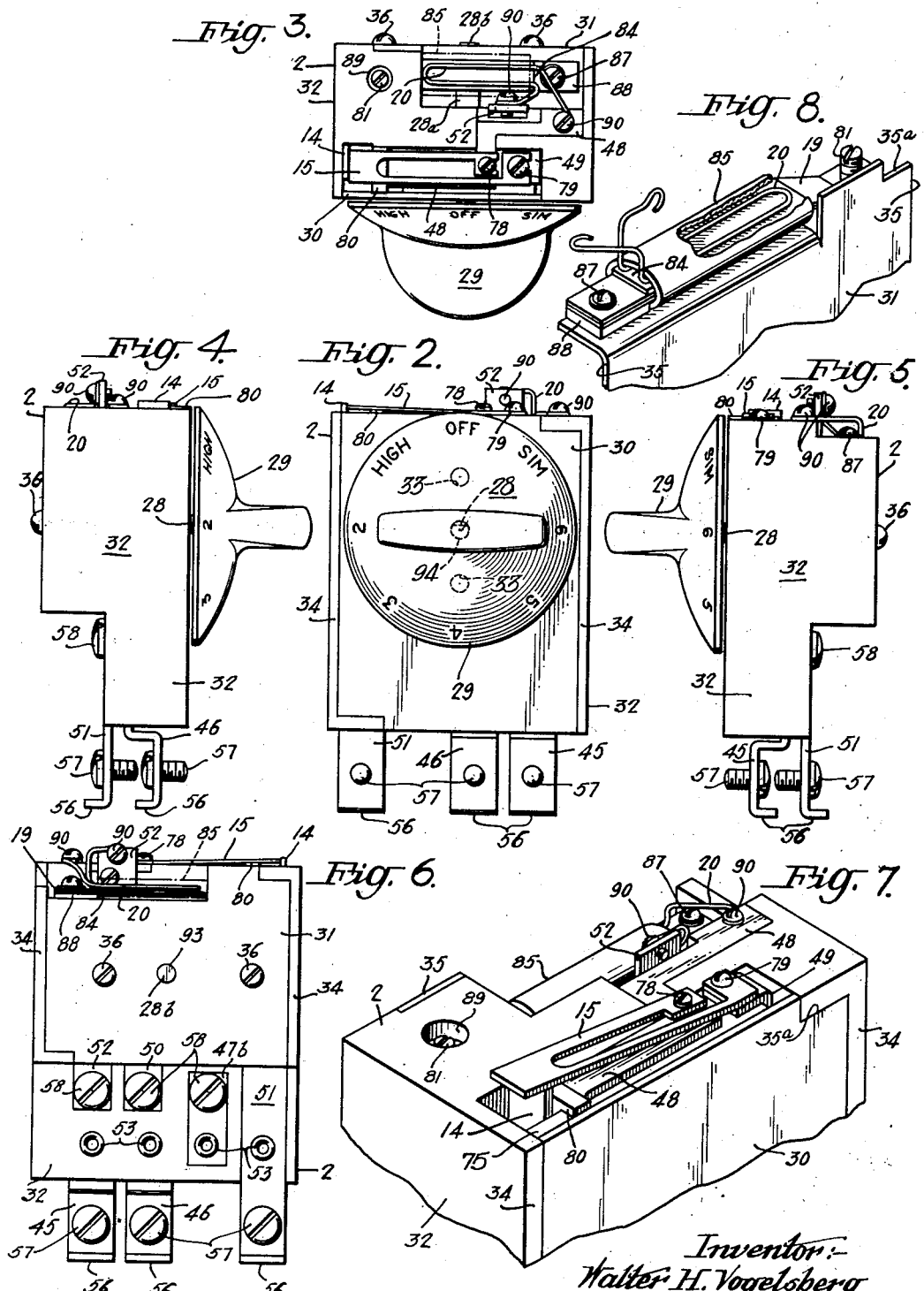

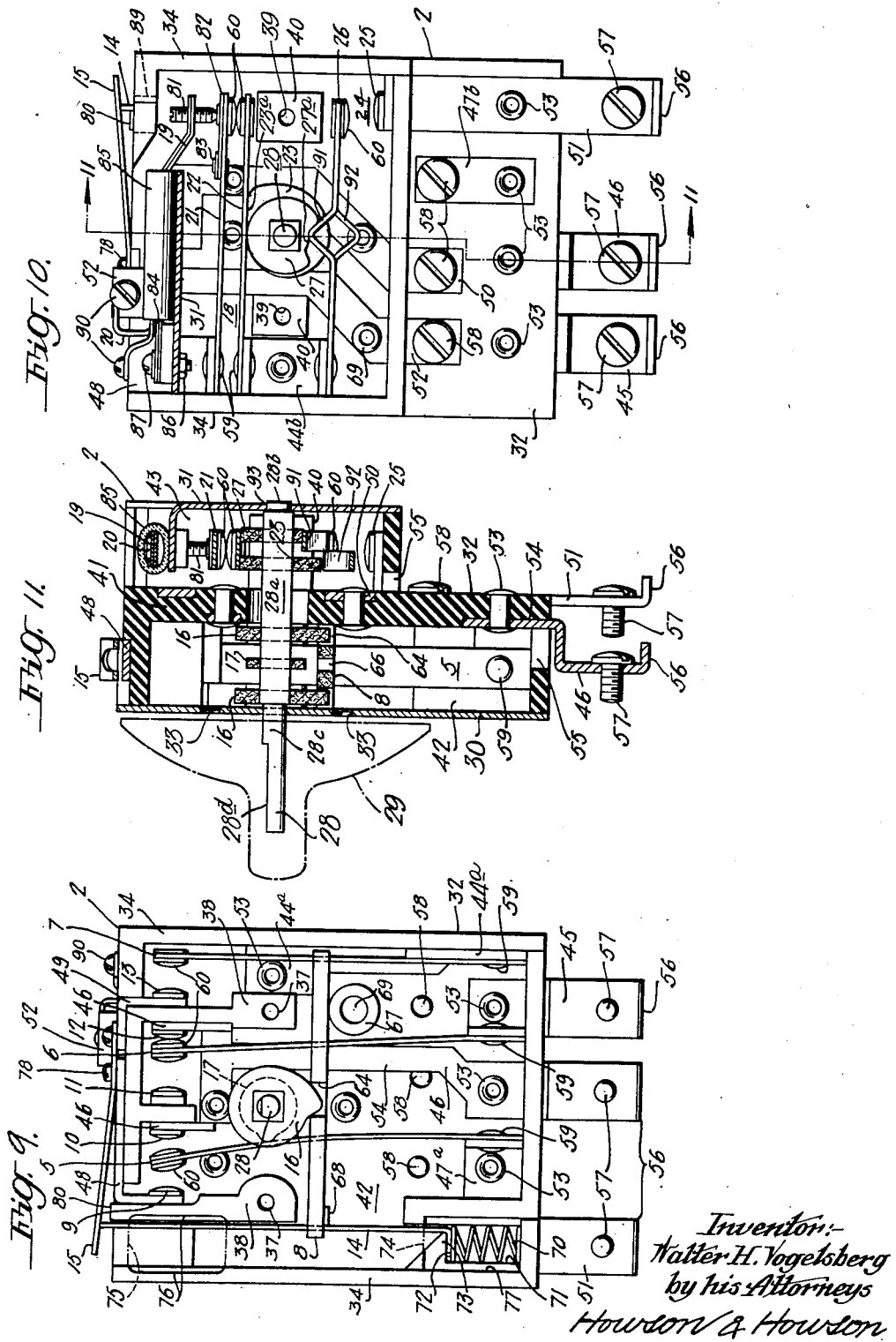

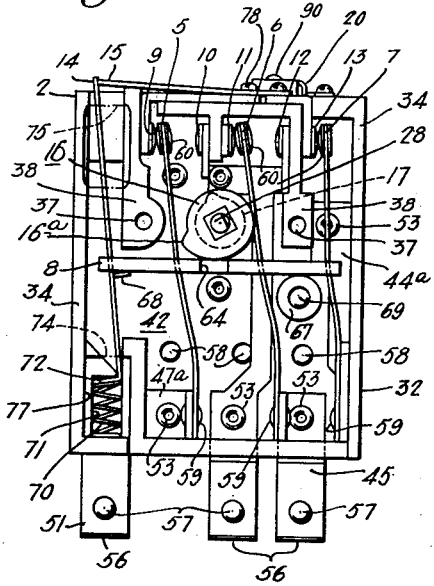
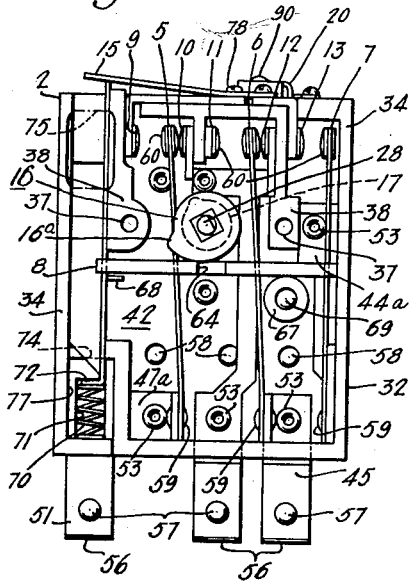
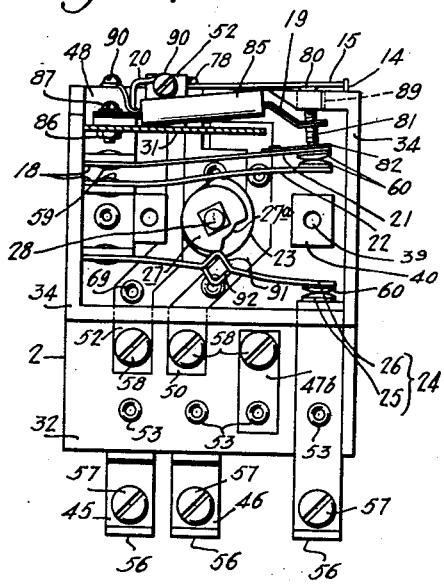
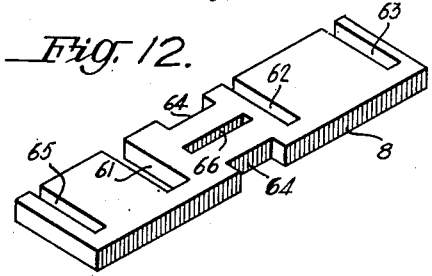
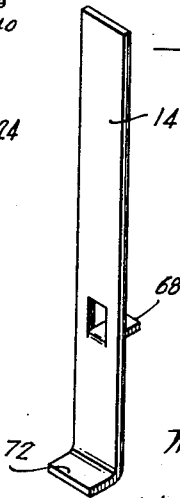

2,648,755

UNITED STATES PATENT OFFICE 2,648,755

CONTROL APPARATUS FOR ELECTRIC HEATING UNITS

Walter H. Vogelsberg, Wayne, Pa., assignor to Proctor Electric Company, Philadelphia, Pa., a corporation of Pennsylvania Application March 17, 1949, Serial No. 81,936

12 Claims. (Cl. 219—20)

This invention relates to control devices and control systems for electric ranges. More particularly, the invention relates to devices and systems by which an electric range heating unit may be "flashed" to a selected temperature, and said heating unit may be caused to operate under normal energization at an average rate of energization dependent upon the control setting. By the "flashing" of an electric heating unit is meant overenergization of the unit to cause a rapid rise of the temperature thereof to the selected temperature.

The flashing of an electric heating unit to a selected temperature is broadly disclosed and claimed in Patent No. 2,210,947, issued August 13, 1940, to J. W. Myers et al. Reference may be had to that patent for the broad principles underlying the present invention.

The principal object of the present invention is the provision of a simple, small-sized and commercially-economical control device which will perform efficiently all of the functions incident to flashing and control of an electric heating unit as hereinafter described.

The flashing of an electric heating unit to a selected temperature and the operation of the unit thereafter under normal energization require variable control of the flash operation and variable control of the input to said unit. These control functions have been achieved in prior devices by the employment of relatively complicated mechanisms.

One object and feature of the present invention is the provision of an extremely simple mechanism for the performance of the above-mentioned control functions. This mechanism comprises a single thermostatic means and a single set of switch contacts. It is therefore a simple dual-purpose mechanism.

Another object of the invention is the provision of a simple switch arrangement to effect flashing of a heating unit and simultaneous dropping of subsequent load to prevent overload. The term "subsequent load" refers to whatever load is connected to the same supply wires subsequent to or beyond the heating unit which is to be flashed. Load dropping during flashing is broadly disclosed and claimed in Patent No. 2,213,993, issued September 10, 1940, to J. W. Myers. By the present invention, a switch arrangement is employed which utilizes only two movable contact elements and four stationary contacts to accomplish both flashing and load dropping.

A further object of the present invention is the provision of a novel flash termination arrangement which includes electrically-operable means in shunt across control contacts. The circuit is arranged so that during flash current flows through the control contacts, but when those contacts are opened to signal the end of the flash cycle, full flash current is supplied to said electrically-operable means to terminate the flash cycle.

It is desirable, in an apparatus of the general character here involved, that a single manual operation shall set the apparatus for automatic flash of the controlled heating unit and subsequent normal operation thereof. A system for accomplishing this, using electromagnetic means, has been shown in the first mentioned patent. Such systems have proven to be quite costly and require large switch structure for their incorporation.

Therefore, another object of this invention is the provision of means for mechanically manipulating the switch elements to accomplish automatic flash in response to the operation of a control knob.

Moreover, it is preferable that the rotation of a control knob to a position for selection of the desired operating temperature shall cause automatic flash of the heating unit to that temperature and subsequent operation of the unit under normal energization.

Another object of this invention is the provision of a novel and improved mechanism for accomplishing automatic flash and subsequent normal energization of a heating unit in response to operation of a control knob.

A further object of the invention is the provision of a novel control device wherein the automatic flashing of a heating unit is optional, there being a control knob which is rotatable in either direction, and which effects automatic flash of the unit when actuated in one direction but which effects only normal operation of the unit when actuated in the other direcion.

Other objects and features of the invention will be apparent from the following detailed description with reference to the accompanying drawings, wherein:

Figure 1a is a schematic view of the control device in a circuit for the control of an electric range heating unit, the contact blades of the device being shown in the "off" position;

Figure 1b shows the contact blades of the control device of Figure 1a in the "flash" position.

Figure 1c shows the contact blades of the control device of Figure 1a in the normal or "run" position;

Figure 2 is a front view of a preferred embodiment of the control device;

Figure 3 is a plan view of said device;

Figures 4 and 5 are side elevational views of said device;

Figure 6 is a rear view of said device;

Figures 7 and 8 are fragmentary perspective views illustrating certain elements more clearly;

Figure 9 is a front view of the control device with the coverplate removed and the various elements shown in the "off" position;

Figure 10 is a rear view of the device with only a section of the rear coverplate removed, the elements being shown in the "off" position;

Figure 11 is a sectional view taken along line 11—11 of Figure 10;

Figure 12 is a perspective view of the flash bar;

Figure 13 is a perspective view of the latch bar;

Figure 14 is a view similar to Figure 9 with the elements in the "flash" position;

Figure 15 is a view similar to Figure 10 with the elements in either the "flash" or "run" position; and Figure 16 is a view similar to Figure 9 with the elements in the "run" position.

The invention may be best understood by first considering the diagrammatic illustration of Figure 1a and the associated Figures 1b and 1c, after which the structure of Figures 2 to 16 may be more readily understood. In Figure 1a, reference characters 1a and 1b designate two sections of an electric heating unit 1. These sections may be considered similar for this discussion, although the scope of this invention obviously need not be restricted thereby. For normal operation, these sections are connected in series across the supply line $L_1$, $L_2$. For flash operation, the two sections are connected in parallel across the supply line. The control device 2, provided by the present invention, effects flashing of the unit 1 to any selected temperature and subsequent normal operation of the unit at an average rate of energization dependent upon the control setting. The device 2 also effects dropping of subsequent load during the flashing of unit 1. For simplicity the subsequent load is represented by the single heating unit 3 having a manual control switch 4.

The device 2 is shown diagrammatically in Fig. 1a, and a particular structural embodiment thereof is shown in Figs. 2 to 16. Referring to Fig. 1a, three resilient contact blades 5, 6 and 7 are fixed at their lower ends and are urged by their own resilience toward the right. Operatively associated with these blades is a "flash bar" 8 by means of which the blades are caused to assume a flash position, as shown in Fig. 1b. The blades cooperate with stationary contacts 9 to 13. The flash bar is connected to a latch bar 14, the lower end of which is resiliently pivoted and the upper end of which is free for movement. This bar cooperates with a bimetal prop latch 15 which is U-shaped and is fixed at its right-hand end. The flash bar 8 is movable toward the left by a manually-rotatable cam 16 to set up the flash condition of Fig. 1b and to move latch bar 14 to latched position wherein it is held by the prop latch 15, as shown by the broken-line illustration of bar 14. The latching of bar 14 maintains the flash condition until it is terminated as presently to be described.

A manually-rotatable cam 17 is associated with blade 5 to hold it away from contact 10 when the device 2 is in the "off" position.

The device 2 further includes an adjustable thermostatic switch 18 which controls the flashing of the unit 1 to the selected temperature, and which also effects normal operation of the unit after the flash operation is terminated. The switch 18 comprises a bimetal member 19, an associated heater 20, an upwardly-biased contact blade 21 adjacent member 19, and a contact blade 22 adjustable by a manually-operable cam 23. The setting of cam 23 determines the temperature to which the unit 1 will be flashed, and it also controls the energy input to unit 1 after termination of the flash cycle.

The device 2 further includes a safety switch 24 comprising a stationary contact 25, a movable contact blade 26, and a manually adjustable cam 27 associated with blade 26. The purpose of this switch will appear later.

The cams 16, 17, 23 and 27 are all mounted on a common shaft, as represented at 28, and the shaft is operable by a single control knob 29.

In the "off" position of device 2, as shown in Fig. 1a, the heating unit 1 is completely disconnected from both sides of the power supply. There are no connections between line $L_1$ and said heating unit because blade 5 is held in an electrically neutral position away from contact 10, and blade 6 makes contact with stationary contact 12. Line $L_2$ does not make circuit with said heating unit, because the safety switch 24 is open. The circuit established through blade 6 and stationary contact 12 insures the availability of power supply to the subsequent load 3.

In the conditioning of the control device 2 to flash the heating unit, the blades assume the position shown in Fig. 1b. The actuation of the various blades to effect this conditioning will be described presently. The circuit connections may be traced as follows: current from $L_1$ of the power supply line goes through the blade 6, contact 11, and thence to the common connection point of the two heating elements 1a and 1b. Here it branches out into two parallel paths. Current goes through heating element 1a, through the blade 5 and contact 9 where it meets the current through the parallel path of heating element 1b and the heater 20. From this point current goes through the contact blades 21 and 22 and thence through blade 26 and stationary contact 25 to line $L_2$ of said power supply. The U-shaped prop latch 15 and the contact 13 and blade 7 shunt the blades 21 and 22 but are of relatively high resistance compared to the closed circuit through said blades.

During this flash cycle, provision is made to drop any subsequent loads on the electric range to prevent exceeding the capacity of the range. The subsequent load 3 is dropped during flash, for the blade 6 does not make contact with the contact 12 thus breaking the continuity of line $L_1$ which forms one side of the supply to said load. It should be noted that the switching functions associated with the flashing of the heating unit 1 and the simultaneous dropping of load 3 utilize only the two blades 5 and 6 and their associated stationary contacts 9 to 12.

The flash cycle is terminated after the bimetal 19, heated by the heater 20, flexes upward to permit the contact blades 21 and 22 to separate. The flash current which previously was shunted through said blades must now proceed through the bimetal prop latch 15, through contact 13 and blade 7, thence through blade 26 and contact 25 and finally to line $L_2$. The heat generated by the current passing through the bimetal prop latch 15 is sufficient to flex said prop upward very rapidly, permitting the latch bar 14, flash bar 8 and associated blades 5, 6 and 7 to move toward the right by the resilient action of said blades. Said blades now assume the position for "run" or normal operation as shown in Fig. 1c.

In the "run" position (Fig. 1c) the two heating units 1a and 1b are connected in series across the power supply. Current from $L_1$ flows through blade 6, contact 12, through contact 10, blade 5, through heating elements 1a and 1b, through heater 20, blades 21 and 22, blade 26 and contact 25 and thence to line $L_2$. The subsequent load 3, which had been dropped, is now restored to the line, for current from $L_1$ can flow through blade 6, contact 12 and thence to the subsequent load and finally back to line $L_2$.

The thermostatic switch 18 now operates in its capacity to control the energy input to the heating unit 1 by controlling the cyclic opening and closing of the contact blades 21 and 22 to disconnect and connect the heating unit from the line. Thus, if a low value of heat, as indicated by markings on the control knob 29, corresponds to, for example, a 20% input, the heating unit would be energized at a constant rate of normal energization for 20% of the total time for a complete cycle to be executed; and during the remaining 80% of the cycle time the heating unit would be disconnected from the power supply line. This time percentage of energization may be termed "variable percentage input." It gives an average rate of energization which is dependent upon the setting of the control knob. The program on the control cam 23, which is associated with the markings on the knob 29, and the manner in which said cam disposes the elements of the thermostatic switch 18 determines the temperature to which the heating unit is raised initially during flash and then the average rate of energization of the heating unit after termination of the flash cycle.

It will be noted that the heater 20 during flash is in one of the two parallel branches formed by the heating unit sections 1a and 1b, whereas during the normal energization period, it is in series with the two sections. The adaptation of a heater, such as 20, in a flasher circuit in this manner is broadly disclosed and claimed in Patent No. 2,207,634, issued July 9, 1940, to J. W. Myers et al. Suffice to say, that the control bimetal 19 associated with this heater 20 substantially tracks the temperature of the heating unit 1 and so acts to control the flashing operation in accordance with the temperature of the heating unit and to prevent over-heating of the unit when the switch is called upon to reflash said heating unit.

The use of the bimetal prop latch 15 and associated switch made up of stationary contact 13 and blade 7 to shunt the contact blades 21 and 22 of the thermostatic switch 18 affords an accurate and reliable method of terminating the flash cycle. The control bimetal 19 does not have to exert the mechanical force necessary to terminate the flash cycle. It need only open the contacts in response to the setting of the control cam 23 and the heat received from the heater 20. The bimetal prop latch 15 is called upon to perform the mechanical functions of flash termination, and said latch is so designed that the full flash current redirected through it will rapidly generate enough heat to exert a more than ample force to overcome the friction at the latching surface and to deflect itself out of the way of the latch bar 14. This scheme is self-protecting, for the movement of the latch bar to the left permits blade 7 and contact 13 to separate. This prevents any overheating and consequent overstressing of the bimetal prop latch 15 by removing it from the circuit until the switch is again set up for flash.

It has been found that wide latitude is allowed in the proportioning of the flash current that flows through the parallel path of contact blades 21 and 22 and bimetal prop latch 15. The ratio of current should be such that an increase with wear in contact resistance between blades 21 and 22 will not cause spurious operation of the bimetal prop latch 15.

A preferred structural embodiment of the control device 2 is shown in Figs. 2 to 16. Referring particularly to Figs. 2 to 8, said device is shown enclosed by the front and rear coverplates 30 and 31 respectively, made preferably of metal, and by a casing 32 molded from some suitable insulating material. Two tapped holes 33 (Fig. 2) are provided in the front coverplate 30 for mounting the switch to the rear or front panel of an electric range (not shown) as the case may be. To accurately locate said coverplates to the casing 32, the edges of the latter are raised as at 34 to cooperate with sides 35 and notches 35a (Figs. 7 and 8) in said coverplates. To secure said coverplates to the casing 32, screws 36 are turned into threaded holes 37 (Fig. 9) of bosses 38, which are part of the front of the casing, and into threaded holes 39 (Fig. 10) of bosses 40, which are part of the rear of the casing.

Referring now to Figs. 9 to 11 the casing 32 is divided by a partition 41 (Fig. 11) into front and rear cavities 42 and 43, respectively. Preformed buses 44 to 52, made preferably of brass, are affixed to casing 32 with rivets or some other suitable fastening means 53. Such rivets may also form current carrying members as from bus 44a in the front cavity 42 to bus 44b in the rear cavity 43. Wherever possible, the casing 32 is recessed to receive buses 44 to 52; thus the partition 41 (Fig. 11) has a recess at 54 to conform to bus 46. Where any of said buses extend to the outside of the casing, holes 55, such as shown in Fig. 11, are provided. Buses 45, 46 and 51 are formed with lugs 56 and are provided with terminal screws 57 to serve as terminal strips for external connections. Other external connections are made to bus runs 47b, 50 and 52 through terminal screws 58 (Fig. 10).

It is possible to have a bus connect contact 10 to blade 6 (connection not shown) as an alternate connection for the bus 46 (Fig. 9) between contact 10 and contact 12. This will not alter the electrical operations; however, the arrangement shown is to be preferred because it facilitates the bus construction in the control device 2.

In Fig. 9 the three resilient blades 5, 6 and 7 are shown mounted in the front cavity 42 of the switch casing 32. Each of the blades is secured at one end to a projection of one of the buses 44a, 45 and 47a, respectively, by rivets or some other suitable fastening means 59. Contacts 60 are welded or riveted to the other ends of said blades. As mentioned before, all three blades are biased toward the right by their own resilience.

The positions of the blades are normally controlled by the position of the flash bar 8, except for the contact blade 5 in the "off" position, wherein said blade is kept away from contact 10 by the cam 17.

Flash bar 8 (see Fig. 12) is normally a rectangular strip of insulating material, preferably Micarta, provided with slots 61, 62 and 63 to receive blades 5, 6 and 7, respectively, plus additional slots to receive and cooperate with projections 16a of the twin cams 16 (Fig. 14), a slot 65 to receive the latch bar 14 and a clearance slot 66. The last mentioned slot is provided to avoid any interference between cam 17 and the operation of the flash bar 8. The flash bar 8 (refer to Fig. 9) normally rests atop a projection 67 and a projection 68 of the latch bar 14 and is restrained from any transverse motion on one side by the partition 41 and on the other side by coverplate 30.

In this particular showing of the invention the projection 67 is a hollow cylinder of insulating material pressed over a long-headed rivet 69 (Fig. 9); said rivet serves the additional function of securing bus run 52 to partition 41 in the rear of the switch (Fig. 10).

The latch bar 14 (shown in detail in Fig. 13) is an L-shaped member with an extension 72 to form the base of the L and the previously mentioned projection 68 formed as a knockout from the upright portion of the L. Spring 70 (Fig. 9) is seated in a cavity 71 in the front of the casing and bears against the lower surface of extension 72 of said latch bar and urges it into engagement at the upper surface of this extension with a projection 73 at the top of the cavity 71. Said projection also acts in cooperation with the side walls of the cavity 71 to control the horizontal motion of the lower end of said latch bar to permit a pivotal action of the latch bar around the point of projection 73 and a translatory motion of said bar in the vertical direction. Two inserts 74 and 75 (shown in phantom in Fig. 9) made of insulating material are set respectively into recesses 76 and 77 of the casing. The lower insert 74 acts to retain spring 70, to restrain the lower end of latch bar 14 from any transverse motion, and to provide an insulating barrier between said latch bar and the metal coverplate 30; the upper insert 75 acts similarly to restrict any transverse motion of the upper end of said latch bar and to provide an insulating barrier between said bar and the aforementioned coverplate.

On the top front of the control device 2 (see Fig. 7) is mounted the bimetal prop latch 15 which is arranged to operate in coordination with the latch bar 14. The latch 15 in its preferred form has a U-shape with one leg of the U fastened by screw 78 to bus 48 and the other leg fastened by screw 79 to bus 49. The base of the U has a straight edge, perpendicular to the legs of the U, to form the propping or latching surface for the latch bar 14. When cold, the bimetal latch is urged by its own resilience down against the top of the latch bar, or if the bar is removed, down against a projection 80 of the casing. The latch is arranged with its high expansion side downward so that when current passes up one leg and down the other leg of the bimetal, it flexes upward. The plane of the buses 48 and 49 onto which the bimetal prop latch 15 is affixed is lower than that of the projection 80 (see Fig. 9). Said projection thus cooperates with said latch to preload the latch and to keep it off the bus 48. Such preloading increases the temperature at which the bimetal latch will begin to move, thus negating the effect of changes in ambient temperature. The preloading also acts to permit the control device 2 to reset almost immediately after flash, for the temperature differential through which the bimetal has to cool before it can properly engage latch bar 14 is reduced.

In the rear cavity of the control device 2, as shown in Fig. 10, are mounted the adjustable thermostatic switch 18 and the safety switch 24 and their associated cams 23 and 27, respectively. The adjustable thermostatic switch 18 comprises the two resilient blades 21 and 22, the control bimetal 19 and the associated heater 20 (Fig. 8). Blade 22 is fastened securely at one end by one of the rivets 59 to a projection of bus 44b. To the free end of said blade is riveted or welded one of the contacts 60. Said blade is biased downward by its resilience against the periphery of the cam 23. A flat portion 23a of the cam 23 cooperates with said blade to provide a detent effect which will be described further hereinafter. Blade 21 is similar to blade 22 except that the former is riveted to bus run 48, is biased upward against an adjusting screw 81 on the control bimetal 19, and is provided with a piece of insulating material 82 secured to the top of the free end of said blade with a suitable fastening means 83. Insulating material 82 provides a bearing surface for the adjusting means 81 that isolates electrically said adjusting means from the current carrying member 21.

The control bimetal and heater assembly is shown in Fig. 8. The assembly consists of the bimetal 19, the heater 20, a thin sheet of insulating material 84, preferably mica, which serves to separate the bimetal and heater, and an insulating cover 85 which may take the form of a sleeve of asbestos. The bimetal is secured to a right angle bend formed in the rear coverplate 31 with a nut and bolt fastening means 86 and 87 (see Fig. 10). Spacer 88 of insulating material thermally insulates the heel of bimetal 19 from the metal coverplate 31. The screw 81 forms the adjusting means for the thermostatic switch 18, for it turns in a threaded hole in bimetal 19 and changes the setting between said bimetal and blade 21. A hole 89 in the casing 32 (see Fig. 7) permits the manipulation of the adjustment with an ordinary screw driver from outside the switch casing without danger of electrical shock. The heater 20, which may take the form of a U bend of resistance wire, is connected electrically at one end to bus 48 by means of screw 90 and at the other end to bus 52 by a similar fastening means.

The safety switch 24 (see Fig. 10) consists of a resilient blade 26 riveted at one end to bus 44b and provided with a contact 60 at its free end and a stationary contact 25 riveted or welded to bus 51. The blade is biased by its own resilience against cam 27. A bump 91 is formed into said blade and cooperates with a detent 27a and the remaining periphery of cam 27 to provide the desired switching action and a detent effect to be described further hereinafter.

The control shaft 28 (see Fig. 11) is provided with a square portion 28a to receive the cams 16, 17, 23 and 27. Said shaft is positioned and supported at two points by the front and rear coverplates 30 and 31, respectively. A small cylindrical portion 28b of shaft 28 fits a hole 93 in the rear coverplate 31 (Fig. 6) to form the rear support. The front support is formed where a longer cylindrical portion 28c of the shaft 28 fits in hole 94 in the front coverplate 30 (Fig. 2). Shaft 28 is prevented from moving longitudinally by the coverplates and the shoulders formed where the cylindrical cross-section changes to that of a square. Flat 28d is milled on the shaft 28 to receive the manual control knob 29 and to insure positive angular displacement of the cams with the rotation of said knob.

There are two specific modes of manually operating the device to control a heating unit. By simply rotating the knob 29 in one direction (clockwise as viewed from the front) to a particular marking to obtain a desired heat, the heating unit is first flashed to attain the desired temperature as quickly as practicable, and said unit is then operated normally at an average rate of energization dependent upon the knob setting. By rotating said knob in the opposite direction, the flashing cycle is omitted and the heating unit is brought up to temperature at said average rate of energization.

The first mode of operating of the device which includes flashing can be best understood by following the mechanical manipulation in Figs. 9, 10, 14 and 15, and the electric circuit diagrammatically shown in Fig. 1.

When the dial 29 is rotated clockwise from the "off" position (Fig. 9) cams 16 mounted on the shaft 28 act in unison to translate the flash bar 8 to the left; said bar is kept from moving down at one end by the support 67 and at the other end by the projection 68 on the latch bar 14. This translatory motion of the flash bar 8 flexes the three blades 5, 6 and 7 from the "off" position toward the left, so that blade 5 makes contact with contact 9; blade 6 with contact 11; and blade 7 with contact 13. At the same time the latch bar 14, actuated also by the flash bar 8, is given a counterclockwise angular displacement of sufficient magnitude around pivot 73 that the bimetal prop latch 15 falls into the propping or latch position.

Said blades and latch bar are now in the "flash" position (as shown in Fig. 14), but the flash cycle is not initiated until the shaft 28 is rotated to such a position that cam 27 closes safety switch 24 (Fig. 15).

Safety switch 24 is closed when blade 26 is forced into contact with the stationary contact 25. Contact is made as the projection 91 of the blade 26 rides out of the detent 27a of the cam 27 on to the circular periphery of said cam. In the particular form of the invention disclosed, the flashing cycle can be initiated after a clockwise angular displacement of about 40° of the dial from the "off" position. This rotation is sufficient to allow the projections 16a of the cams 16 (Fig. 14) to ride up over the flash bar 8 at the edges of the slots 64 and thus to avoid any interference with motion of flash bar 8 toward the right at the completion of the flash cycle. This would prevent intentional or accidental attempts to hold the heating unit in the overenergized state.

The rotation of the manual control knob 29, to obtain a desired "heat," changes the setting of the variable input device 18 and varies the temperature and therefore the deflection upward which the main control bimetal 19, heated by the heater 20, must attain before the cooperating contacts of blades 21 and 22 open (see Figs. 10 and 15). At any particular input the contacts must be maintained closed that percentage of the time necessary to supply the losses due to dissipation and so maintain the control bimetal at some average temperature corresponding to its mean-deflected position. The program on control cam 23, which is a function of the angular position of the control knob 29, determines the amount of deflection given to the lower blade 22; this blade in turn urges the free end of the upper blade 21 against the adjusting screw 81 and thus forces the bimetal 19 to be deflected upward.

In the second mode of operating the device, when it is desired to bring the temperature of the heating unit up slowly, the flash cycle can be avoided by rotating the knob 29 counterclockwise. The cams 16 act against flash bar 8 and cause it to be rotated counterclockwise around pivotal support 67. This action depresses the latch bar 14 downward, but does not allow it to be latched into the flash position. The heating unit 1 will then be operated under normal energization if the knob 29 has been rotated sufficiently for the safety switch 24 to be closed. The minimum counterclockwise rotation necessary for the operation to be initiated is determined by the displacement of the shaft 28 necessary for cam 17 to clear blade 5 and permit the latter to take its running position against contact 10. The various elements of the switch take the positions shown in Figs. 15 and 16.

By turning the knob 29 in either direction to the "off" position, the heating unit 1 is completely disconnected from both sides of the power supply. The circuit has been designed so that minimum blade manipulation would be necessary to terminate the conditioning of the control device 2 from the "run" position. Rotation of the knob 29 simply causes cam 17 to move blade 5 away from contact 10 and permits the bump 91 of blade 26 to ride into the detent 27a of cam 27 and thus open safety switch 24. It will be observed that when the control knob 29 is rotated in a counterclockwise direction to terminate "run" conditioning of said device, the flash bar 8 is rotated in a counterclockwise direction and translated slightly to permit the cam 16 to be carried to "off" position. This particular arrangement or its equivalent is inherently necessary in a device which is designed to set up for automatic flash when rotated to a desired input.

The flash cycle can be interrupted by turning the knob 29 to the "off" position in either direction. This causes the projections 16a on cams 16 to rotate flash bar 8 around pivotal support 67 and thus depress the latch bar 14 downward against spring 70 a sufficient amount for said bar to clear the bimetal prop latch 15 and to be carried to the "off" position by the spring force exerted by the resilient blades 5, 6 and 7.

A double detent action is provided to insure a positive off conditioning of the control device 2. Firstly, the resilient blade 22 of the thermostatic switch 18 is biased against cam 23 and cooperates with the flat 23a on said cam to urge the control shaft 28 toward the "off" position. Secondly, the bump 91 of the blade 26 of the safety switch 24 so cooperates with the sides of the detent 27a of the cam 27 as to provide additional detent action.

The subject matter of this application is related to that of Serial No. 157,933, filed April 25, 1950; Serial No. 87,462, filed April 14, 1949; and Serial No. 250,326, filed October 8, 1951, all having the same inventor and assignee as this application.

From the foregoing description it will be seen that the invention provides a novel control system and control device for the control of a heating unit, particularly a heating unit of an electric range. While a particular embodiment of the invention has been illustrated and described, it will be apparent that the invention is not limited thereto but is capable of other forms of physical expression.

I claim:

1. In a system for overenergization of a serially-connected two-section electric range heating unit from a two-wire supply and for dropping subsequent load during such overenergization, the sections of said unit having a common junction; a first switch including a movable contact connected to one of the supply wires, a first relatively stationary contact connected to the junction of the series-connected sections of said unit, and a second relatively stationary contact connected to the subsequent load circuit; a second switch including a movable contact connected to one end of said unit, a first relatively stationary contact in circuit with the other end of said unit and the second wire of said supply, and a second relatively stationary contact connected to the subsequent load circuit; said switches and the connections controlled thereby effecting either parallel or series connection of the two sections of said unit and dropping subsequent load during the parallel connection of such sections; manually-operable means for moving said movable contacts to position for overenergization; control switch means comprising a single pair of contacts adjustable according to the selected temperature to which it is desired to heat said unit; overenergization termination mechanism adapted to cause movement of said movable contacts to position for normal operation, said termination mechanism including electrically-operable means; and means for connecting said electrically-operable means in shunt with said control switch means during the overenergization; said electrically-operable means being short-circuited by the closed contacts of said control switch means during the overenergization but being operable upon opening of the latter contacts to effect overenergization termination when said unit reaches the selected temperature, said unit thereafter being energized at the desired average rate through the control action of said control switch means.

2. In a system for effecting overenergization of an electrical heating unit to heat the same rapidly to a selected temperature, and for effecting subsequent normal operation of the heating unit at a desired average rate of energization, connections and switch means for effecting either overenergization or normal operation of said heating unit, an adjustable thermostatic switch and a heater element therefor in circuit with said heating unit, said heater element serving to actuate said thermostatic switch according to the thermal condition of said heating unit, a single manual control member adapted for only one mode of actuation, cam means operable by said control member mechanically engaging said switch means to position the same for overenergization of said heating unit, other cam means operable by said control member to adjust said thermostatic switch to operate at a selected temperature, and means controlled by said thermostatic switch for terminating the overenergization of said heating unit when the latter reaches the selected temperature.

3. In a system for effecting overenergization of an electrical heating unit to heat the same rapidly to a selected temperature, and for effecting subsequent normal operation of the heating unit at a desired average rate of energization, connections and switch means arranged to effect either overenergization or normal operation of the heating unit, a latch member operative in latch position to hold said switch means in the overenergization position, a thermostatic latch prop arranged cooperatively with said latch member to hold the latter in latched position, an adjustable thermostatic switch and a heater element therefor in circuit with said heating unit, said heater element serving to actuate said thermostatic switch according to the thermal condition of said heating unit, said thermostatic switch being arranged to control said thermostatic latch prop and also to control the normal operation of said heating unit, and means including a single manual control member adapted for only one mode of actuation for actuating said switch means and said latch member, and for adjusting said thermostatic switch.

4. In a system for effecting overenergization of an electrical heating unit to heat the same rapidly to a selected temperature, and for effecting subsequent normal operation of the heating unit at a desired average rate of energization, connections and switch means arranged to effect either overenergization or normal operation of the heating unit, said switch means including a plurality of spring blades, a latch member, means for effecting mechanical coupling between said blades and said member, whereby said member is adapted when in latched position to hold the blades in the overenergization position, a thermostatic latch prop arranged cooperatively with said latch member to hold the latter in latched position, an adjustable thermostatic switch and a heater element therefor in circuit with said heating unit, said heater element serving to actuate said thermostatic switch according to the thermal condition of said heating unit, said thermostatic switch being arranged to control said thermostatic latch prop and also to control the normal operation of said heating unit, and means including a single manual control member adapted for only one mode of actuation for actuating said switch means and said latch member, and for adjusting said thermostatic switch.

5. In a system for effecting overenergization of an electrical heating unit to heat the same rapidly to a selected temperature, and for effecting subsequent normal operation of the heating unit at a desired average rate of energization, connections and switch means for effecting either overenergization or normal operation of said heating unit, a latch member operative in latched position to hold said switch means in the overenergization position, a thermostatic latch prop arranged cooperatively with said latch member to hold the latter in latched position, an adjustable thermostatic switch and a heater element therefor in circuit with said heating unit, said thermostatic switch comprising a single pair of contacts, said heater element serving to actuate said thermostatic switch according to the thermal condition of said heating unit, means including a single manual control member for adjusting said thermostatic switch to operate at a desired temperature and for simultaneously instituting overenergization of said heating unit, and means for connecting said thermostatic latch prop in shunt with said thermostatic switch during overenergization of the heating unit, whereby said latch prop is short-circuited by said thermostatic switch but is effective upon initial opening of said thermostatic switch to interrupt the overenergization and to institute normal operation of said heating unit under control of said thermostatic switch.

6. In a system for effecting overenergization of an electrical heating unit to heat the same rapidly to a selected temperature, and for effecting subsequent normal operation of the heating unit at a desired average rate of energization, connections and switch means arranged to effect either overenergization or normal operation of the heating unit, a latch member operative in latched position to hold said switch means in the overenergization position, a thermostatic latch prop arranged cooperatively with said latch member to hold the latter in latched position, an adjustable thermostatic switch and a heater element therefor in circuit with said heating unit, said heater element serving to actuate said thermostatic switch according to the thermal condition of said heating unit, means including a single manual control member for actuating said switch means and said latch member, and for adjusting said thermostatic switch, and means for connecting said thermostatic latch prop in shunt with said thermostatic switch during overenergization of the heating unit, whereby said latch prop is short-circuited by said thermostatic switch but is effective upon initial opening of the thermostatic switch to interrupt the overenergization and to institute normal operation of said heating unit under control of said thermostatic switch.

7. In a system for effecting overenergization of an electrical heating unit to heat the same rapidly to a selected temperature, and for effecting subsequent normal operation of the heating unit at a desired average rate of energization, connections and switch means for effecting either overenergization or normal operation of said heating unit, a latch member operative in latched position to hold said switch means in the overenergization position, a thermostatic latch prop arranged cooperatively with said latch member to hold the latter in latched position, an adjustable thermostatic switch and a heater element therefor in circuit with said heating unit, said thermostatic switch comprising a single pair of contacts, said heater element serving to actuate said thermostatic switch according to the thermal condition of said heating unit, a rotatable manual control member, cam means operable by rotation of said control member to position said switch means for overenergization of said heating unit, other cam means operable by rotation of said control member to adjust said thermostatic switch to operate at a desired temperature, and means for connecting said thermostatic latch prop in shunt with said thermostatic switch during overenergization of the heating unit, whereby said latch prop is short-circuited by said thermostatic switch but is effective upon initial opening of said thermostatic switch to interrupt the overenergization and to institute normal operation of said heating unit under control of said thermostatic switch.

8. In a system for overenergization of a serially connected two-section electric range heating unit from a two-wire supply and for dropping subsequent load during such overenergization, the sections of said unit having a common junction, two switches each having only one switch blade and two cooperating relatively stationary contacts, two contacts of the respective switches being directly interconnected with one another and also connected to the subsequent load, the other contact of one switch being connected to the junction of said serially connected heating unit sections, the other contact of the second switch being connected to one end of the heating unit and also to one wire of said supply, the switch blade of the first switch being connected to the other wire of said supply, and the switch blade of said second switch being connected to the other end of said heating unit, said switch blades being conjointly movable between a first position wherein the first switch blade establishes said junction at the potential of one wire of said supply, and the second blade establishes the ends of the heating unit at the potential of the other wire of said supply to thereby overenergize said heating unit, and a second position wherein said switch blades engage the interconnected contacts to establish a continuity of circuit to the subsequent load and also to energize the heating unit through its ends only.

9. In a system for effecting overenergization and normal operation of an electric heating unit, connections for supplying electrical energy to said unit, switch means for varying said connections to effect either overenergization or normal operation of the heating unit, a manual control member operable between an "off" position and any one of a plurality of selectable "heat" positions, means operable by said manual member after a predetermined travel thereof from said "off" position toward one of the selectable "heat" positions for mechanically manipulating said switch means so as to establish overenergization connections, an auxiliary switch and associated camming means operable by said manual control member to permit current flow to said heating unit only after the predetermined travel to complete mechanical manipulation to establish overenergization connections is effected, means effective upon further travel of said manual member for selecting one of said "heats," automatic overenergization terminating means for actuating said switch means so as to establish connections for normal operation of said heating unit at the selected "heat" at the end of the overenergization period, and means effective to prevent reestablishment of overenergization when said manual member is moved from the selected "heat" position to the "off" position through the overenergization establishing position of said manual member.

10. In a system for effecting overenergization and normal operation of an electric heating unit; connections for supplying electrical energy to said unit; switch means for varying said connections to effect either overenergization or normal operation of the heating unit; manual control means operable between an "off" position and any one of a plurality of selectable "heat" positions; means operable by said manual means after a predetermined travel thereof from the "off" position toward one of the selectable "heat" positions for mechanically manipulating said switch means to establish overenergization connections, said last means including a cam member operable by said manual means, an actuating member movable by said cam member and arranged to control the position of said switch means, and latch means associated with said actuating member arranged so that movement of said manual means through a predetermined travel from the "off" position transmits movement through said actuating member to said latch means to effect latching of said switch means in said overenergization position; additional camming means effective upon further travel of said manual means for selecting one of said "heats"; and automatic overenergization terminating means for releasing said latch means and in turn the actuating member and switch means so as to establish connections for normal operation of said heating unit at the selected "heat"; said cam member, said actuating member and said latching means comprising means to prevent reestablishment of overenergization when said manual means is moved from the selected "heat" position to the "off" position through the overenergization establishing position of said manual means.

11. In a system for effecting overenergization and normal operation of an electric heating unit; connections for supplying electrical energy to said unit; switch means for varying said connections including switch blades movable between a first position to effect overenergization of the heating unit and a second position to effect normal operation of the heating unit; a manual control member operable between an "off" position and any one of a plurality of "on" positions corresponding to various selectable "heats"; means operable by said manual member including a cam member, an actuating bar movable by said cam member and arranged to control the position of said switch blades, a movable-pivot latch member associated with said bar, and a thermostatic prop member adapted when cold to restrain movement of said latch member, wherein movement of said manual member through a predetermined travel from the "off" position to one of the "on" positions transmits movement through said cam and actuating bar to rotate said latch member into a position where it is held by said thermostatic member and in turn holds said switch blades in said overenergization position; additional camming means effective upon further travel of said manual member for selecting one of said "heats"; and automatic overenergization terminating means for causing flexing of said prop member to release said latch member and in turn the actuating bar and switch blades so as to establish connections for normal operation of said heating unit at the selected "heat," said first cam member being arranged to translate said latch member away from said prop member to release the overenergization connections in the event that the manual member is turned to "off" before overenergization is terminated, said cam member being effective to move said latch member away from said prop latch as permitted by its movable pivot to prevent reestablishment of overenergization connections in the event the manual member is turned to "off" after normal energization connections have been established.

12. In a control system for operating an electric heating unit at any one of a plurality of "heats," a continually rotatable manually adjustable member movable in either a clockwise or counter-clockwise direction to any one of a plurality of angular positions corresponding to the "heats," means responsive to rotation of said member in one direction for effecting overenergization of said unit so as to bring the unit rapidly to the desired temperature corresponding to the selected "heat," said means also being responsive to rotation of said member in the other direction to the same angular position to effect normal operation of the heating unit to achieve the same desired temperature, and means rendered operative upon institution of overenergization on rotation in said first direction for terminating the overenergization when said unit reaches the selected temperature.

WALTER H. VOGELSBERG.

References Cited in the file of this patent

UNITED STATES PATENTS

| Number | Name | Date |
|---|---|---|
| 2,102,295 | Thomson | Dec. 14, 1937 |
| 2,123,699 | Kahn et al. | July 12, 1938 |
| 2,207,634 | Myers et al. | July 9, 1940 |
| 2,210,947 | Myers et al. | Aug. 13, 1940 |
| 2,213,993 | Myers | Sept. 10, 1940 |
| 2,215,404 | Myers | Sept. 17, 1940 |
| 2,327,925 | Myers | Aug. 24, 1943 |
| 2,357,225 | Roesch et al. | Aug. 29, 1944 |
| 2,385,434 | Weber | Sept. 25, 1945 |
| 2,388,702 | Pearce | Nov. 13, 1945 |
| 2,402,787 | Stickel | June 25, 1946 |
| 2,418,359 | Link | Apr. 11, 1947 |
| 2,451,576 | Pearce | Oct. 19, 1948 |